United States Patent [19]
Boden et al.

[11] 3,805,040
[45] Apr. 16, 1974

[54] SELF-CHECKED SINGLE BIT CHANGE REGISTER

[75] Inventors: Robert C. Boden; Forrest L. Wade, both of San Jose, Calif.

[73] Assignee: International Business Machines Corporation, Armonk, N.Y.

[22] Filed: June 4, 1973

[21] Appl. No.: 366,821

[52] U.S. Cl. ....................235/153 AP, 235/92 EC, 235/153 AM, 340/146.1 AG

[51] Int. Cl.... G11c 29/00, G06m 3/12, G06f 11/10

[58] Field of Search.. 235/92 EC, 153 AP, 153 AM; 340/146.1 AG

[56] References Cited

UNITED STATES PATENTS

| | | | |
|---|---|---|---|
| 3,555,255 | 1/1971 | Toy | 235/153 AP |
| 3,567,916 | 3/1971 | Fullton | 235/153 AP |
| 3,699,322 | 10/1972 | Dorr | 235/153 AP |

*Primary Examiner*—Malcolm A. Morrison
*Assistant Examiner*—R. Stephen Dildine, Jr.
*Attorney, Agent, or Firm*—Owen L. Lamb

[57] ABSTRACT

An error detecting circuit for checking a single bit change register so as to determine whether or not a change in that register has occurred. The present state of a bit in the register is compared with its desired new state to thereby produce an indication if a change in state is required. The indication is compared with a parity of all the bits in the register and the relationship of the parity to the change indication is stored in a latch. The output of the latch is compared with a new parity after the change is effected. If no errors have occurred, the latch output and the new parity will agree.

4 Claims, 2 Drawing Figures

SELF-CHECKED SINGLE BIT CHANGE REGISTER

The invention relates to error detection and more particularly to a circuit for detecting a malfunction in a single bit change register.

Prior circuits for detecting a register malfunction convert the code of a binary register to a second code having a parity which alternates in correspondence to the presence or absence of pulses in the input signal. The circuit senses the parity of the output code and compares the sensed parity with the input signal thereby predicting the changed parity.

This type of parity checking scheme for data transfer does not lend itself to error detection of single bit change registers. The selected bit does not provide sufficient information for insuring that the other bits in the register behave properly during a bit change operation.

It is therefore an object of this invention to provide a lost cost method of self-checking a single bit change register without requiring a read back check.

A further object of this invention is to provide a checking circuit which detects all single errors which occur during the time of a set/reset operation in a single bit change register.

Briefly, the above objects are accomplished in accordance with the invention by comparing the present state of a bit with its desired new state to thereby produce an indication if a change in state is required. The indication is compared with a parity of all the bits in the register and the relationship of the parity to the indication is stored in a latch. The output of the latch is compared with a new parity after the change is effected. If no errors have occurred, the latch output and the new parity will agree.

These and other objects, advantages and features of the present invention will become more readily apparent from the following specification when taken in conjunction with the drawings.

Figure 1A:
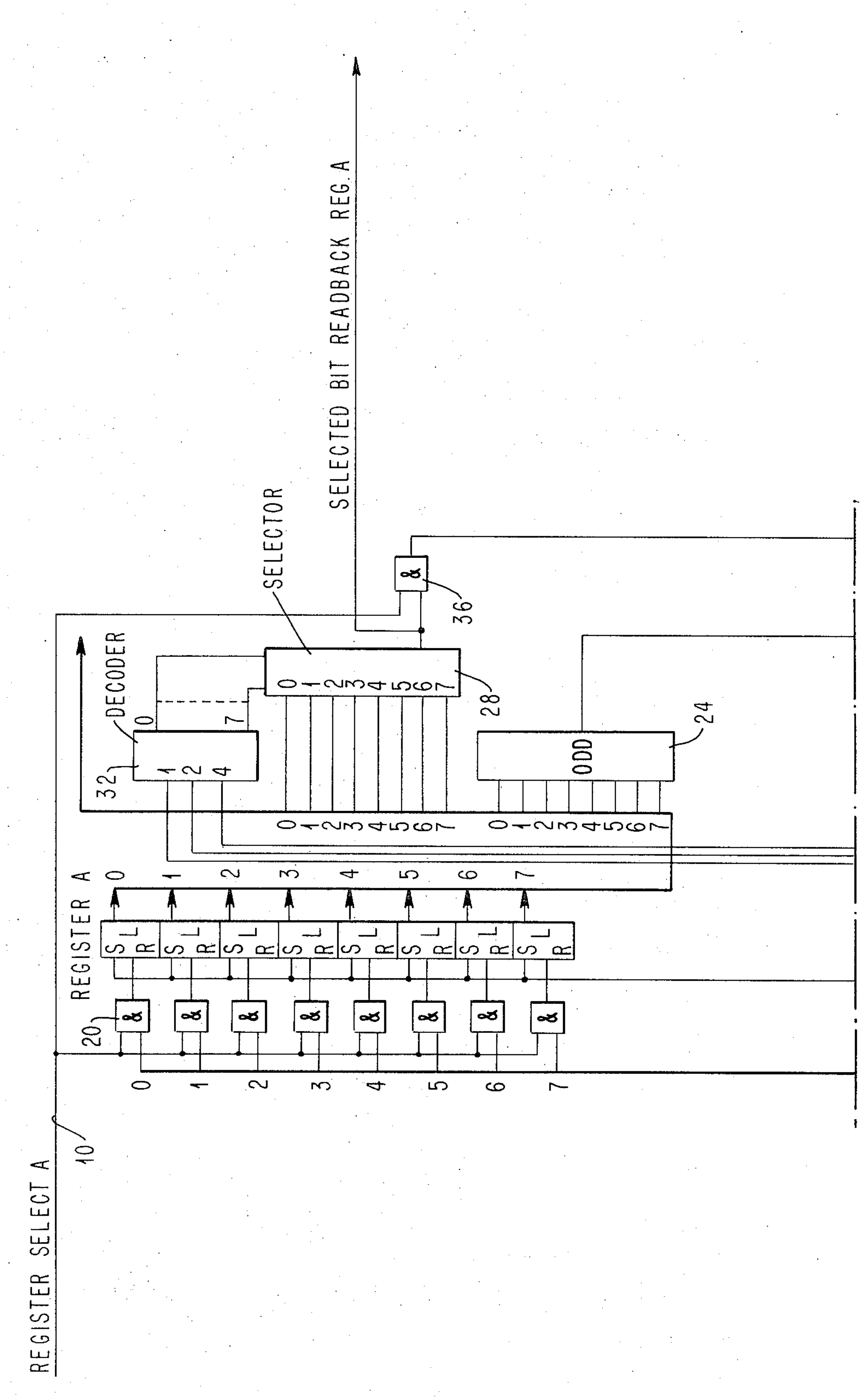
Figure 1B:
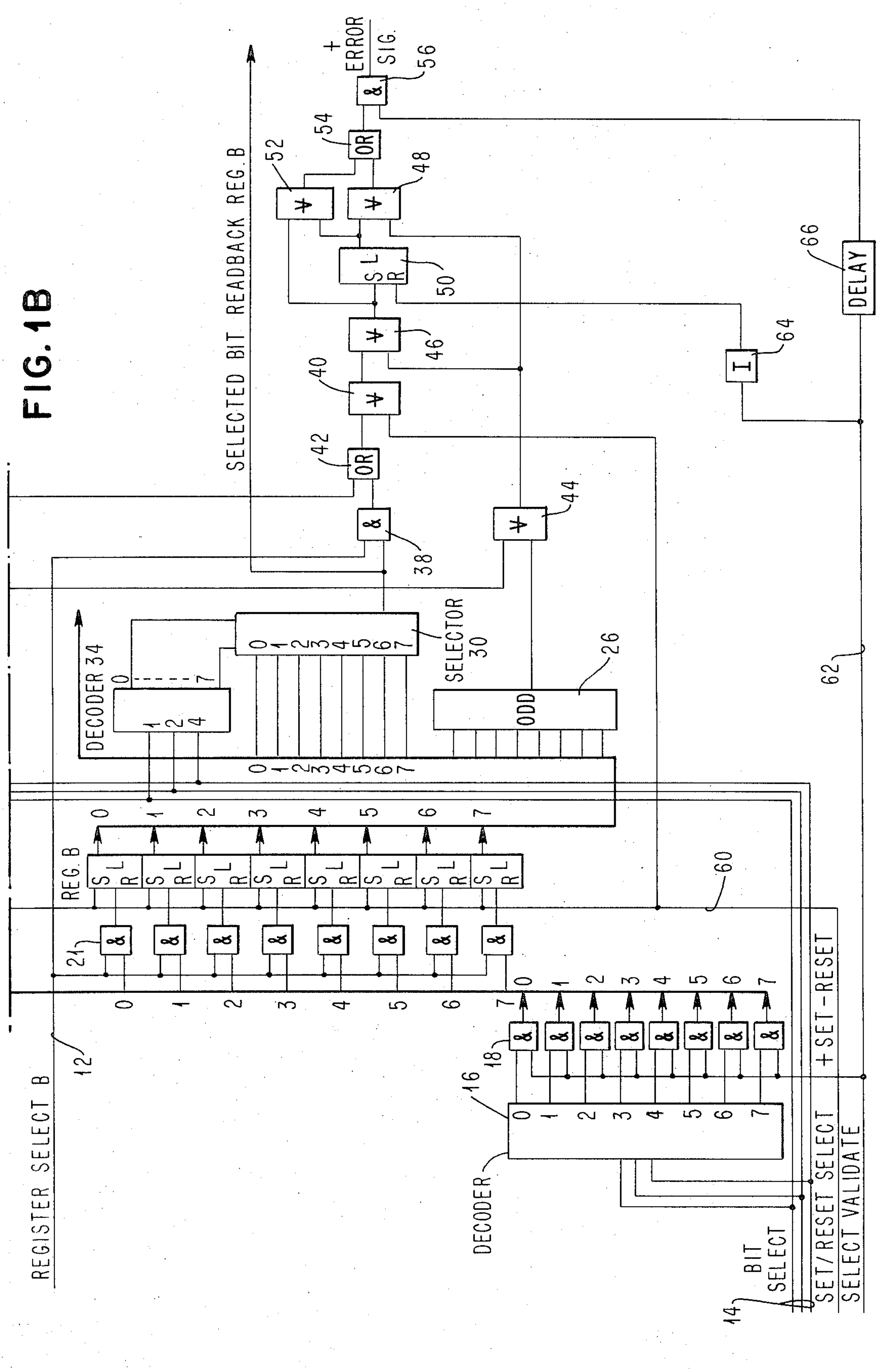

FIG. 1A and 1B form a composite diagram of two single bit change registers in which the invention is embodied.

DESCRIPTION

Referring to FIG. 1A and 1B, two single bit registers A and B are shown. Only one register is selected at a time by raising either the register select A line 10 or the select register B line 12. Data are entered into the registers by means of bit select lines 14 which feed a decoder 16 which decodes the bit select lines to one of eight outputs, 0–7. The eight outputs are fed to eight AND circuits 18; the outputs of which feed corresponding AND circuits 20, 21 which feed respective inputs of registers A and B. The AND circuits 18 are energized by the select validata line 62 which is described more fully subsequently.

The outputs of register A and B are connected to the inputs of odd parity circuits 24 and 26, respectively. These circuits provide a positive output if the modulo 2 sum of the inputs is odd. The outputs of registers A and B are also fed to bit selectors 28 and 30, respectively. These bits selectors operate in conjunction with decoders 32 and 34 to provide a single output indicative of the bit selected by the bit select lines 14. The output of the selector is fed to an AND circuit 36 for register A and an AND circuit 38 for register B. These AND circuits are gated by the register select lines 10 and 12 so that only one register output is submitted to exclusive OR 40 via the ORed output of OR 42. The outputs of the odd circuits 24 and 26 are fed to an exclusive OR 44 which provides the modulo 2 sum across both registers. The output of exclusive OR 44 feeds exclusive OR's 46 and 48. The output of exclusive OR 46 is fed to the input of a latch 50 and to an exclusive OR circuit 52. The outputs of exclusive OR's 52 and 48 feed an OR circuit 54 and finally an AND circuit 56.

A set/reset select line 60 is provided. When the line is positive, the selected bit in register A or B will be set and when this line is negative, the selected bit will be reset.

A select validate line 62 is provided which is used after the bit select and the set/reset lines have been energized to provide a bit sample to set the selected bit in the register A or B, to freeze the contents of latch 50 by means of the inverted input 64 and after an appropriate delay 66, to sample the AND 56 for an error condition.

Referring to FIG. 1B, it is assumed that coded information is present on the bit select lines 14 and set/reset select lines 60 prior to the arrival of the signal on the select validate line 62 (the usual situation). During this time, a selected bit is read out at selector circuit 30. This output is compared at exclusive OR 40 with the state of the set/reset select line 60. The output of 40 is low (−) if the selected bit already stands at the state desired. Conversely, if change is required in order for the selected bit to achieve the desired state, the output of 40 is high (+). Exclusive OR 40 feeds exclusive OR 46. The polarity hold latch 50 is in series with exclusive OR 46 but it should be noted that at this time, it simply forms a feed through path because its control input R is up (the select validate line is down).

The ODD circuit 26 continually takes the modulo 2 count of the contents of register B. The output of circuit 26 enters the exclusive OR chain at both circuits 46 and 48 via exclusive OR 44. Therefore, prior to the time that the select validate line rises, the output of exclusive OR 48 is up (+) if a change in the state of the selected bit is required or down (−) if no change is required. Whether the register contents are ODD or EVEN makes no difference at this time to the output of exclusive OR 48 because the output of circuit 44 enters the exclusive OR chain twice (and therefore cancels). Both inputs of exclusive OR 52 will obviously be the same, either both up or both down, and its output will therefore be down (−).

The arrival of the signal on the select validate line 62 causes, first of all, the dropping of the control input R to polarity hold latch 50. The output of the latch freezes at whatever its state was prior to the rise of select validate. The select validate line also operates through the appropriate AND circuit 18 at the output of decoder 16 to cause a set or reset action at the selected bit position of register A and/or B according to the state of the set/reset select line.

Suppose that the selected bit was initially determined to require change in state. Prior to the rise of the select validate line, the output of exclusive OR 48 would be up and the condition would be set for indication of error (the output of OR circuit 54 would be high). If the selected bit actually does change state as a consequence of the rise of select validate, the parity of register B will change. This is noted by ODD circuit 26 which changes state at its output. This change affects exclusive OR 48, the output of which drops to the no-error level. The action of the checking circuitry is such that it detects either the type of failure which could cause a selected bit to fail to change state when it should or the type where a bit changes state in addition to the selected bit. If such errors occur, circuit 48 is left with its output standing at the up or error level. Sampling of the AND 56 takes place at an appropriate delay (circuit 66) after the rise of select validate but while it is still present.

Suppose that the selected bit was initially determined to be already in the desired state — no change required. Prior to the rise of the select validate line, the output of both exclusive ORs 46 and 52 would be down, the no-error condition. If the selected bit, or some other bit, changes state (erroneously) at the time the select validate signal occurs, the parity of register B will change. This is noted by ODD circuit 26, the output of which affects exclusive OR 46 causing its output to go up (+) and thus indicate error. (No change should have taken place).

Suppose that the selected bit was initially determined to require change in state. Prior to the rise of the select validate line, the output of exclusive OR 46 would be up. The output of exclusive OR 52 would be down (both its inputs would be the same). If a failure occurs in either of the decoder circuits such that the wrong bit is selected and its state is changed, then the output of the ODD circuit 26 will change but not the output of the select circuit 30. The output of exclusive OR 46 will change. (Under normal conditions, the output of 46 will not change when select validate rises, because any change in the output of 30 is balanced by the change in output 26). The change in output of exclusive OR 46 affects one input only of exclusive OR 52 because the polarity hold output of 50 is fixed. The output of 52 will go up and thus indicate error. It will be noted that the output of exclusive OR 46 will drop under these conditions, thus requiring the exclusive OR 52 if this particular kind of decoder failure is to be detected.

Two single bit change registers are checked using in part the same circuitry shown in FIG. 1B. To cascade the checking circuitry, it is required that only one register be selected for change at any one time. This is the usual case in typical implementations.

Each register requires an output bit select circuit 28 in FIG. 1A and 30 in FIG. 1B. Also required are ODD circuits across each register 24 in FIG. 1A and 26 in FIG. 1B, but cascaded so as to form a circuit 44 which takes the modulo 2 count of the contents of all the registers. It is also required that only the selected register enter into the initial determination whether a change in state of the selected bit is required.

It is assumed that information is present on the register select line A or B, bit select lines 14, and the set/reset line 60 prior to the arrival of the signal on the select validate line 62.

Suppose it is desired to reset a particular bit in register B. According to the setting of the bit select lines, the bit is selected and read out at circuit 30. This output feeds through AND circuit 38 and OR 42 to the exclusive OR 40. Here a comparison is made with the state of the set/reset select line 60. If a change in state of the selected bit is required, the output of 40 is high (+). Conversely, if the bit is already in the desired state, the output of circuit 40 is low (−).

It is assumed that only one register is selected at any one time, therefore, in the case of register A, the AND circuit at 13 is not conditioned. The register select A line is down and, therefore, information coming from circuits such as 36 will not enter the checking computation.

Suppose the selected bit is in the set state. The output of 40 is up indicating that a change in state of the selected bit is required. The output of 40 feeds through exclusive OR 46, the polarity hold latch 50, and appears at the output of exclusive OR 48 as an up level. The modulo 2 count of the contents of both registers A and B appears at the output of exclusive OR 44. This enters the exclusive OR chain at two places, 46 and 48, and therefore makes no difference at this time in the output of exclusive OR 48. The remaining checking action, following the rise of the select validate line 62, is exactly the same as explained above except that the checking circuitry also detects the erroneous change of a bit in a register not selected at the time that select validate occurs. This kind of error is detectable because all registers, whether selected or not, actually enter into the modulo 2 count which is present at the output of 44. In the example above, if the selected bit in register B is properly reset, this causes the output of 44 to change and thus cause removal of the up level (the error level) at circuit 48. But if another bit in either register A or B also changes state, this balances out in the modulo 2 count circuitry and the error level remains at the output of 48 to be subsequently sampled and detected as an error at AND circuit 56.

The checker is also capable of being cascaded so that a number of similar registers may be checked simultaneously (provided only one register is selected at one time). The timing characteristics of the checker make its application especially attractive where clocking capability may be limited.

While the invention has been particularly shown and described with reference to a preferred embodiment thereof, it will be understood by those skilled in the art that various changes in form and detail may be made therein without departing from the spirit and scope of the invention.

What is claimed is:

1. A circuit for checking a single bit change register having a plurality of stages, wherein a signal applied to the input of the register changes or does not change the state of a selected stage in accordance with information to be stored therein, comprising:

means for comparing the present state of a bit stage with an input signal indicating the desired new state of said stage and for generating an indication if a change is required;

means for obtaining the modulo 2 sum of all bit stages and for producing a parity output indicating said sum;

means responsive to said parity output for indicating the relationship of said sum to said change indication and for storing a manifestation of the result; and means for comparing said manifestation with said parity output, whereby if said manifestation and the new parity agree after said change is effected no errors have occurred.

2. A circuit for checking a plurality of single bit change registers, each having a plurality of stages, wherein a signal applied to the input of one of said register changes or does not change the state of a selected stage in accordance with information to be stored therein, comprising:

means for comparing the present state of a bit stage with an input signal indicating the desired new state of said stage and for generating an indication if a change is required;

means for gating said input signal to only one of said registers at a time;

means for obtaining the modulo 2 sum of all bit stages of all said registers and for producing a parity output indicating said sum;

means responsive to said parity output for indicating the relationship of said sum to said change indication and for storing a manifestation of the result; and means for comparing said manifestation with said parity output, whereby said manifestation and the new parity agree if no errors have occurred in any of said registers after said change is effected.

3. A circuit for checking a single bit change register having a plurality of stages, wherein a signal applied to the input of the register changes or does not change the state of a selected stage in accordance with information to be stored therein, comprising:

means for comparing the present state of a bit stage with an input signal indicating the desired new state of said stage and for generating an indication if a change is required;

means for obtaining the modulo 2 sum of all bit stages and for producing a parity output indicating said sum;

means responsive to said parity output for indicating the relationship of said sum to said change indication and for storing said result in a latch; and means for comparing the output of said latch with said parity output, whereby the latch output and the new parity agree if no errors have occurred after said change is effected.

4. A checking circut comprising:

a single bit change register comprising a plurality of bi-stable stages;

a first decoder responsive to coded bit select lines for providing a single output for selecting the input of one of said bi-stable stages;

a second decoder responsive to said bit select lines for providing a single output for selecting the output of said one bi-stable stage;

a select validate input;

a set/reset select input for changing the state of said selected bi-stable stage upon energization of said select validate input;

a first exclusive OR means for exclusive ORing said set/reset input with said selected output of said one bi-stable stage to thereby provide an anticipated bit change indication;

a parity circuit for generating a parity output indicating the modulo 2 sum of the outputs of said register;

a second exclusive OR for exclusive ORing said bit change indication with said parity output;

a latch responsive to the output of said second exclusive OR for storing the state of said one bi-stable stage prior to the setting of a new state into said bistable stage; and a third exclusive OR combining the output of said latch with the output of said parity circuit to thereby provide an error indication if said latch output and said parity output do not agree after the state of said one bi-stable stage has been changed upon energization of said select validate input.

* * * * *